(12) United States Patent
Rogunova et al.

(10) Patent No.: US 8,642,700 B2
(45) Date of Patent: Feb. 4, 2014

(54) THERMOPLASTIC COMPOSITION HAVING LOW GLOSS AND LOW TEMPERATURE IMPACT PERFORMANCE

(75) Inventors: Marina Rogunova, Pittsburgh, PA (US); James P. Mason, Carnegie, PA (US); Xiangyang Li, Seven Fields, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1039 days.

(21) Appl. No.: 11/592,424

(22) Filed: Nov. 3, 2006

(65) Prior Publication Data
US 2008/0108751 A1 May 8, 2008

(51) Int. Cl.
*C08G 63/48* (2006.01)

(52) U.S. Cl.
USPC .............. 525/64; 525/67; 525/69; 525/80; 525/902; 528/196; 524/109; 524/141; 524/445; 524/127; 523/436; 523/467

(58) Field of Classification Search
USPC .............. 525/64, 67, 69, 80, 902; 528/196; 524/109, 141, 445, 127; 523/436, 467
See application file for complete search history.

(56) References Cited

U.S. PATENT DOCUMENTS

| 4,460,733 | A | 7/1984 | Carter, Jr. et al. | 524/493 |
|---|---|---|---|---|
| 4,526,926 | A | 7/1985 | Weber et al. | 525/67 |
| 4,677,162 | A * | 6/1987 | Grigo et al. | 525/67 |
| 4,885,335 | A | 12/1989 | Gallucci et al. | 525/67 |
| 4,902,743 | A | 2/1990 | Boutni | 525/67 |
| 5,026,777 | A | 6/1991 | Jalbert et al. | 525/65 |
| 5,308,894 | A | 5/1994 | Laughner | 523/436 |
| 6,613,820 | B2 | 9/2003 | Fujiguchi et al. | 524/109 |
| 2002/0165300 | A1 | 11/2002 | Fujiguchi et al. | 524/141 |

FOREIGN PATENT DOCUMENTS

CA 2 033 903 C 12/2001

* cited by examiner

*Primary Examiner* — Mark Kaucher
(74) *Attorney, Agent, or Firm* — John E. Mrozinski, Jr.

(57) ABSTRACT

A thermoplastic composition suitable for making articles having low gloss and good impact resistance at low temperatures is disclosed. The composition contains (A) 10 to 90 percent relative to the weight of the composition (pbw) of an aromatic (co)poly(ester)carbonate, (B) 10 to 90 pbw of first graft (co)polymer containing a graft base selected from the group consisting of polyurethane, ethylene vinyl acetate, silicone, ethylene-propylene diene rubbers, ethylene propylene rubbers, acrylate rubbers, diene rubbers, and polychloroprene, and a grafted phase, (C) 1 to 20 pbw of a linear glycidyl ester functional polymer comprising repeating units derived from one or more glycidyl ester monomers and (D) 1 to 20 pbw of a second graft (co)polymer containing a core and shell wherein the core contains an interpenetrated network of poly(meth)alkyl acrylate and polyorganosiloxane, and wherein the shell contains poly(meth)acrylate.

20 Claims, No Drawings

THERMOPLASTIC COMPOSITION HAVING LOW GLOSS AND LOW TEMPERATURE IMPACT PERFORMANCE

FIELD OF THE INVENTION

The invention is directed to a thermoplastic composition and in particular to a molding composition containing aromatic polycarbonate.

TECHNICAL BACKGROUND OF THE INVENTION

Thermoplastic compositions containing aromatic polycarbonate, including compositions that additionally contain an elastomeric impact modifier are known and available commercially. Polycarbonate compositions exhibiting low gloss are also known.

The art is noted to include U.S. Pat. No. 4,460,733 in which disclosed was a polycarbonate composition having low gloss, the composition containing silica characterized by its average particle size and specific surface area. U.S. Pat. No. 4,526,926 disclosed a low gloss carbonate polymer blend that contains a rubber modified copolymer such as ABS. Thermoplastic blends having low gloss containing polycarbonate, ABS and an impact modifying graft were disclosed in U.S. Pat. No. 4,677,162. The polybutadiene content of the ABS is 1 to 18% and its average particle size is greater than 0.75 micron; the average particle size of the impact modifying graft is less than 0.75 micron.

Low gloss thermoplastic composition with good physical properties containing a blend of a polycarbonate with an acrylonitrile-styrene-acrylate interpolymer and a gloss-reducing amount of a glycidyl(meth)acrylate copolymer was disclosed in U.S. Pat. No. 4,885,335. U.S. Pat. No. 4,902,743 disclosed a low-gloss thermoplastic blend that contains aromatic carbonate polymer, acrylonitrile-butadiene-styrene copolymer; and a polymer of glycidyl methacrylate. Thermoplastic molding compositions having inherent matte or low gloss surface finish containing a blend of polycarbonate, an emulsion grafted ABS polymer, and a poly(epoxide) were disclosed in U.S. Pat. No. 5,026,777 and in CA2033903.

SUMMARY OF THE INVENTION

A thermoplastic composition suitable for making articles having low gloss and good impact resistance at low temperatures is disclosed. The composition contains (A) 10 to 90 percent relative to the weight of the composition (pbw) of an aromatic (co)poly(ester)carbonate, (B) 10 to 90 pbw of first graft (co)polymer containing a graft base selected from the group consisting of polyurethane, ethylene vinyl acetate, silicone, ethylene-propylene diene rubbers, ethylene propylene rubbers, acrylate rubbers, diene rubbers, and polychloroprene, and a grafted phase, (C) 1 to 20 pbw of a linear glycidyl ester functional polymer comprising repeating units derived from one or more glycidyl ester monomers and (D) 1 to 20 pbw of a second graft (co)polymer containing a core and shell wherein the core contains an interpenetrated network of poly alkyl(meth)acrylate and polyorganosiloxane, and wherein the shell contains poly(meth)acrylate.

DETAILED DESCRIPTION OF THE INVENTION

The inventive thermoplastic composition is suitable for preparing articles that are characterized by their low 60° gloss and good impact strength at low temperature. The composition comprises (A) 10 to 90, preferably 30 to 80 percent by weight relative to the weight of the composition (pbw) of an aromatic (co)poly(ester)-carbonate, (B) 10 to 90, preferably 15 to 70 pbw of first graft (co)polymer containing a graft base selected from the group consisting of polyurethane, ethylene vinyl acetate, silicone, ethylene-propylene diene rubbers, ethylene propylene rubbers, acrylate rubbers, diene rubbers, and polychloroprene, and a grafted phase, (C) 1 to 20 pbw of a linear glycidyl ester functional polymer comprising repeating units derived from one or more glycidyl ester monomers and (D) 1 to 20, preferably 1 to 10 pbw of a second graft (co)polymer containing a core and shell wherein the core contains an interpenetrated network of poly alkyl(meth)acrylate and polyorganosiloxane, and wherein the shell contains poly(meth)acrylate.

(A) Aromatic (Co)Poly(Ester)Carbonate

The term aromatic (co)poly(ester)carbonates, refers to homopolycarbonates, copolycarbonates, including polyestercarbonates. These materials are well known and are available in commerce. (Co)poly(ester)carbonates may be prepared by known processes including melt transesterification process and interfacial polycondensation process (see for instance Schnell's "Chemistry and Physics of Polycarbonates", Interscience Publishers, 1964) and are widely available in commerce, for instance under the trademark Makrolon® from Bayer MaterialScience.

Aromatic dihydroxy compounds suitable for the preparation of aromatic (co)poly(ester)carbonates (herein referred to as polycarbonates) conform to formula (I)

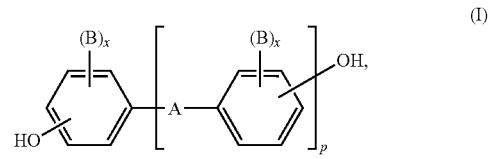

wherein

A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

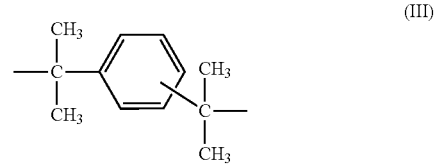

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl)sulfoxides, bis-(hydroxyphenyl)ketones, bis-(hydroxyphenyl)-sulfones and α,α-bis-(hydroxyphenyl)-diisopropyl-benzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A). These compounds may be used singly or as mixtures containing two or more aromatic dihydroxy compounds.

Chain terminators suitable for the preparation of polycarbonates include phenol, p-chlorophenol, p-tert.-butylphenol, as well as long-chained alkylphenols, such as 4-(1,3-tetramethylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used. Polycarbonates may be branched in a known manner, preferably by the incorporation of 0.05 to 2.0%, based on the molar amount of the aromatic dihydroxy compounds used, of compounds having a functionality of three or more, for example compounds having three or more phenolic groups. Aromatic polyestercarbonates are known. Suitable such resins are disclosed in U.S. Pat. Nos. 4,334,053: 6,566,428 and in CA1173998, all incorporated herein by reference.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1. Branching agents may also be used in the preparation of suitable polyestercarbonates, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol. %, based on diphenols used. Phenolic branching agents can be placed in the reaction vessel with the diphenols, acid chloride branching agents may be introduced together with the acid dichlorides.

The content of carbonate structural units in the thermoplastic aromatic polyester carbonates may be up to 99 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The preferred thermoplastic aromatic polycarbonates have weight-average molecular weights (measured by gel permeation chromatography) of at least 25,000, more preferably at least 26,000. Preferably these have maximum weight-average molecular weight of 80,000, more preferably up to 70,000, particularly preferably up to 50,000 g/mol.

(B) First Graft (Co)Polymer

The first graft (co)polymer, component (B) of the inventive composition refers to rubber-modified copolymer. Such rubber-modified (co)polymers are well known and are available commercially and include a graft base (backbone) and a grafted phase. The rubber in these materials is exemplified by polyurethane, ethylene vinyl acetate, silicone, ethylene-propylene diene rubbers, ethylene propylene rubbers, acrylate rubbers, diene rubbers, polychloroprene and the like. The preferred rubber is diene rubbers or mixtures of diene rubbers, i.e. any rubbery polymer (a polymer having a second order transition temperature not higher than 0° C., preferably not higher than −20° C., per ASTM D-746-52T) of one or more conjugated 1,3-dienes. Such rubbers include homopolymers of 1,3-dienes as well as copolymers and interpolymers of 1,3-dienes with one or more copolymerizable monomers such as mono-ethylenically unsaturated polar monomers and/or monovinylidene aromatic monomers.

For the purposes of this invention, a polar monomer is a polymerizable ethylenically unsaturated compound bearing a polar group having a group moment in the range from about 1.4 to about 4.4 Debye units and determined by Smyth, C. P., Dielectric Behavior and Structure, McGraw-Hill Book Company, Inc., New York (1955). Exemplary polar groups include —CN, —$NO_2$, —$CO_2H$, —OH, —Br, —Cl, —$NH_2$ and —$OCH_3$. Preferably, the polar monomer is an ethylenically unsaturated nitrile such as acrylonitrile and methacrylonitrile with acrylonitrile being especially preferred. Examples of such other polar monomers include α,β-ethylenically unsaturated carboxylic acids and their anhydride, and alkyl, aminoalkyl and hydroxyalkyl esters such as acrylic acid, methacrylic acid, itaconic acid, maleic anhydride, ethyl acrylate, butyl acrylate, methyl methacrylate, hydroxyethyl and hydroxypropyl acrylates, aminoethyl acrylate, and the like.

Exemplary of the monovinylidene aromatic monomers are styrene; alpha-alkyl monovinylidene monoaromatic compounds (e.g., α-methylstyrene, α-ethylstyrene, α-methylvinyltoluene, α-methyl dialkylstyrenes, etc.); ring-substituted alkyl styrenes (e.g., ortho-, meta-, and paravinyl toluene, o-ethylstyrene; p-ethylstyrene, 2,4-dimethylstyrene, p-tertiary butyl styrene, etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.); vinyl naphthalene; vinyl anthracene, etc. If so desired, mixtures of such monovinylidene aromatic monomers may be employed. Particularly preferred is styrene and mixtures of styrene and alpha-methyl styrene.

The rubber-modified copolymer may also contain a relatively small amount, usually a positive amount that is less than about 2 weight percent based on the rubber component, of a crosslinking agent, such as divinylbenzene, diallyl maleate, diallyl fumarate, diallyl adipate, allyl acrylate, ethylene glycol dimethacrylate, and the like, provided that such crosslinking does not adversely effect the elastomeric properties of the rubber component.

The rubber-modified copolymer contains a random copolymer of a monovinylidene aromatic monomer and the polar comonomer, a rubber grafted or blocked with a copolymerized mixture of the monovinylidene aromatic monomer and the polar comonomer. Preferably, the process for preparing the rubber-modified copolymer is by the mass or mass suspension polymerization process. These processes have been disclosed in U.S. Pat. Nos. 3,509,237; 3,660,535; 3,243,481; 4,221,833 and 4,239,863, incorporated herein by reference. Such large size rubber particles typically vary in size from about 0.8 to about 6, preferably from about 0.9 to about 4, microns as determined by transmission electron micrography.

Although less preferred in the context are rubber-modified copolymers prepared using an emulsion process, disclosed in, among others, U.S. Pat. Nos. 3,551,370; 3,666,704; 3,956,218 and 3,825,621, incorporated herein by reference.

The rubber-modified copolymers of the present invention contain 3 to 50, preferably 5 to 25, weight percent rubber component, 49 to 96, preferably 50 to 90 weight percent monovinylidene aromatic monomer, and 1 to 48, preferably 5 to 25 weight percent monoethylenically unsaturated polar monomer.

The preferred embodiment entails ABS (acrylonitrile-butadiene-styrene) resin preferably prepared by mass suspension polymerization characterized in that their polybutadiene content is about 5 to 20 percent by weight, more preferably about 8 to 18 percent by weight, and in that its particle size ranges from about 0.3 to 6 microns, preferably 0.4 to 5.5 microns, more preferably 0.8 to 5 microns, most preferably 3.5 to 5 microns.

(C) Linear Glycidyl Ester

Component (C) is a linear glycidyl ester functional polymer comprising repeating units derived from one or more glycidyl ester monomers. The glycidyl ester polymer may be a polymer, copolymer, or terpolymer. A glycidyl ester monomer means a glycidyl ester of α,β-unsaturated carboxylic acid such as, e.g., acrylic acid, methacrylic acid, itaconic acid, and includes, e.g., glycidyl acrylate, glycidyl methacrylate, glycidyl itaconate. Suitable glycidyl ester polymers useful in the present invention include the glycidyl esters impact modifiers described in U.S. Pat. No. 5,981,661, incorporated herein by reference. Preferably, the glycidyl ester polymer comprises at least one repeating unit polymerized from glycidyl ester monomer and at least one repeating unit polymerized from α-olefin monomers, e.g., ethylene, propylene, 1-butene, 1-pentene. Preferably, the glycidyl ester monomer is glycidyl acrylate or glycidyl methacrylate.

Suitable linear glycidyl ester functional polymers optionally contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and $C_{1-20}$-alkyl(meth)acrylates such as, e.g., butyl acrylate, methyl methacrylate, cyclohexyl methacrylate. As used herein, the term $C_{1-20}$-alkyl means a straight or branched alkyl group of from 1 to 20 carbon atoms per group, such as e.g., methyl, ethyl, cyclohexyl and the term "(meth)acrylate" refers to acrylate compounds and to methacrylate compounds.

Suitable glycidyl ester copolymers may be made by conventional free radical initiated copolymerization.

More preferably, the glycidyl ester polymers useful in the present invention are selected from olefin-glycidyl(meth)acrylate polymers, olefin-vinyl acetate-glycidyl(meth)acrylate polymers and olefin-glycidyl (meth)acrylate-alkyl(meth)acrylate polymers. Most preferably, the glycidyl ester polymer is selected from random ethylene/acrylic ester/glycidyl methacrylates copolymers or terpolymers.

In the preferred embodiment, component (C) of the inventive composition contains structural units derived from ethylene, (meth)acrylate, and glycidyl(meth)acrylate. Advantageously component C is a terpolymer selected from the group consisting of ethylene/alkylacrylate/glycidyl methacrylate; ethylene/alkyl acrylate/glycidyl acrylate; ethylene/alkyl methacrylate/glycidyl acrylate; and ethylene/alkyl methacrylate/glycidyl methacrylate. The alkyl component of the (meth)acrylate desirably contains between 1 to 10 carbon atoms. Preferably, the alkyl acrylate or methacrylate polymer of the terpolymer is a methyl acrylate or methyl methacrylate.

The relative amounts of these units are 1 to 40%, preferably 5 to 35%, more preferably 25 to 33% of (meth)acrylate, 1 to 20%, preferably 4 to 20%, more preferably 7 to 10% of glycidyl(meth)acrylate, the balance in each case, preferably 55 to 80% being units derived from ethylene.

The preferred component (C) has a melting point of about 149° F. and Vicat softening point of <100° F., measured according to ASTM D1525 under a 1 kg load. The melt index, measured at 190° C. under a 2.16 kg load using ASTM Method D1238, is 6.5 gm/10 min. Advantageously the number average molecular weight of the suitable terpolymer is 10,000 to 70,000.

A terpolymer suitable as component (C) conforming to

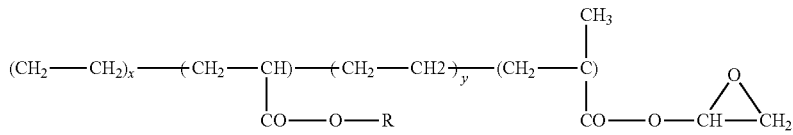

is available commercially from Arkema as Lotader AX8900.

(D) Second Graft (Co)Polymer

The second graft (co)polymer, component (D) of the inventive composition has core/shell structure. It may be obtained by graft polymerizing alkyl(meth)acrylate and optionally a copolymerizable vinyl monomer onto a composite rubber core. The composite rubber core that includes interpenetrated and inseparable interpenetrating network (IPN) type polymer is characterized in that its glass transition temperature is below 0° C., preferably below −20° C., especially below −40° C. Suitable such graft (co)polymers are known and have been described in the literature including U.S. Pat. Nos. 6,362,269; 6,403,683; and 6,780,917, all incorporated herein by reference.

The amount of component C present in the inventive composition is 1 to 20, advantageously 2 to 15, preferably 5 to 12, most preferably 7 to 10 phr.

The preferred core is polysiloxane-alkyl(meth)acrylate interpenetrating network (IPN) type polymer that contains polysiloxane and butylacrylate.

The shell is a rigid phase, preferably polymerized of methylmethacrylate. The weight ratio of polysiloxane/alkyl(meth) acrylate rigid shell is 10-90/5-15/5-5, preferably 10-85/7-12/7-12.

The rubber core has median particle size ($d_{50}$ value) of 0.05 to 5, preferably 0.1 to 2 microns, especially 0.1 to 1 micron. The median value may be determined by ultracentrifuge measurement (W. Scholtan, H. Lange, Kolloid, Z. und Z. Polymere 250 (1972), 782-1796).

The polyorganosiloxane component in the silicone acrylate composite rubber may be prepared by reacting an organosiloxane and a multifunctional crosslinker in an emulsion polymerization process. It is also possible to insert graft-active sites into the rubber by addition of suitable unsaturated organosiloxanes.

The organosiloxane is generally cyclic, the ring structures preferably containing from 3 to 6 silicon atoms. Examples include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, which may be used alone or in a mixture of 2 or more such compounds. The organosiloxane component is present in the silicone acrylate rubber in an amount of at least 70%, preferably at least 75%, based on the weight of the silicone acrylate rubber.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Graft-active sites may be included into the polyorganosiloxane component of the silicone acrylate rubber by incorporating a compound conforming to any of the following structures:

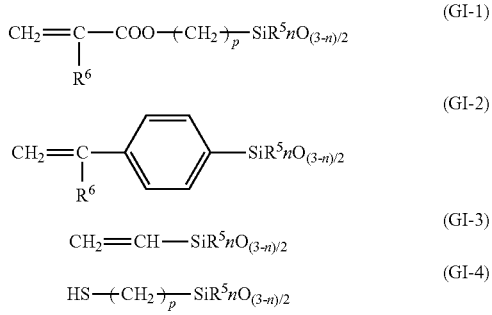

wherein
$R^5$ denotes methyl, ethyl, propyl or phenyl,
$R^6$ denotes hydrogen or methyl,
n denotes 0, 1 or 2, and
p denotes 1 to 6.

(Meth)acryloyloxysilane is a preferred compound for forming the structure (GI-1). Preferred (meth)acryloyloxysilanes include β-methacryloyloxyethyl-dimethoxy-methyl-silane, γ-methacryloyl-oxy-propylmethoxy-dimethyl-silane, γ-methacryloyloxypropyl-dimethoxy-methyl-silane, γ-methacryloyloxypropyl-trimethoxy-silane, γ-methacryloyloxypropyl-ethoxy-diethyl-silane, γ-methacryloyloxypropyl-diethoxy-methyl-silane, γ-methacryloyloxy-butyl-diethoxy-methyl-silane.

Vinylsiloxanes, especially tetramethyl-tetravinyl-cyclotetrasiloxane, are suitable for forming the structure GI-2.

p-Vinylphenyl-dimethoxy-methylsilane, for example, is suitable for forming structure GI-3. γ-Mercaptopropyldimethoxy-methylsilane, γ-mercaptopropylmethoxy-dimethylsilane, γ-mercaptopropyldiethoxy-methylsilane, etc. are suitable for forming structure (GI-4).

The amount of these compounds is from up to 10%, preferably 0.5 to 5.0% (based on the weight of polyorganosiloxane).

The acrylate component in the silicone acrylate composite rubber may be prepared from alkyl(meth)acrylates, cross linkers and graft-active monomer units.

Examples of preferred alkyl(meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate is particularly preferred.

Multifunctional compounds may be used as cross linkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of 0.1 to 20%, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619, both incorporated herein by reference.

The graft polymerization onto the graft base may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell may be formed of a mixture of

I. 0 to 80%, preferably 0 to 50%, especially 0 to 25% (based on the weight of the graft shell), of vinyl aromatic compounds or ring-substituted vinyl aromatic compounds (e.g. styrene, α-methylstyrene, p-methylstyrene), vinyl cyanides (e.g. acrylonitrile and methacrylonitrile), and II. 100 to 20%, preferably 100 to 50%, especially 100 to 75% (based on the weight of the graft shell) of at least one monomer selected from the group consisting of (meth)acrylic acid ($C_1$-$C_8$)-alkyl esters (e.g. methyl methacrylate, n-butyl acrylate, tert.-butyl acrylate) and derivatives (e.g. anhydrides and imides) of unsaturated carboxylic acids (e.g. maleic anhydride and N-phenyl maleimide).

The preferred graft shell includes one or more (meth) acrylic acid ($C_1$-$C_8$)-alkyl esters, especially methyl methacrylate.

Particularly suitable graft (co)polymer is available from Mitsubishi Rayon Co., Ltd. under the Metablen trademark.

The inventive composition may further include additives that are known for their function in the context of thermoplastic compositions that contain poly(ester)carbonates. These include any one or more of lubricants, mold release agents, for example pentaerythritol tetrastearate, nucleating agents, antistatic agents, thermal stabilizers, light stabilizers, hydrolytic stabilizers, fillers and reinforcing agents, colorants or pigments, flame retarding agents and drip suppressants.

The inventive compositions may be prepared conventionally using conventional equipment and following conventional procedures.

The inventive composition may be used to produce moldings of any kind by thermoplastic processes such as injection molding, extrusion and blow molding methods.

The Examples which follow illustrate the invention.

EXAMPLES

In preparing the exemplified compositions that are described below the following materials were used:

Polycarbonate—a mixture containing about 85 wt. % homopolycarbonate based on bisphenol A (MFR 13 g/10 min.) and 15 wt % homopolycarbonate based on bisphenol A (MFR 38 g/10 min.)

First graft polymer—a mass polymerization ABS resin having polybutadiene rubber content of about 15% relative to the weight of the resin and weight average particle size of about 3 microns Linear glycidyl ester copolymer—Lotader 8900 terpolymer a product of Arkema containing about 30 percent by weight of ethyl acrylate, 62 percent by weight of ethylene, and 8 percent by weight of glycidyl methacrylate having reactive epoxy groups.

Second graft copolymer 1—methyl methacrylate (MMA)—grafted siloxane(Si)-butyl acrylate (BA) composite rubber containing MMA shell and Si—BA in the core, silicon content about 16% by weight. (Metablen S2001 a product of Mitsubishi Rayon)

Second graft copolymer 2—methyl methacrylate (MMA)—grafted siloxane(Si)-butyl acrylate (BA) composite rubber containing MMA shell and Si—BA in the core. Silicon content of about 81% by weight. (Metablen SX005)

All the exemplified compositions contained 64.51 percent polycarbonate (the percent relative to the weight of the composition-herein pbw) 30.79 pbw first graft polymer and 0.7 pbw of a mixture of conventional release agent and thermal stabilizer, the mixture having no criticality in the context of the invention. The balance, 6 pbw containing the indicated amounts of linear glycidyl ester copolymer and second graft (co)polymer.

The preparations of the compositions and molding of test specimens were conventional. The melt flow rate (MFR) determined per ASTM D 1238 at 260° C.; 5 Kg load. 60° Gloss was determined in accordance with ASTM D523 the impact strength was determined as Izod at ⅛" at room temperature (RT) and at the indicated temperatures.

The tables below summarize the results of these tests.

TABLE 1

| Components | Control 1-1 | Control 1-2 | Control 1-3 | Control 1-4 | Example 1-1 | Example 1-2 | Example 1-3 |
|---|---|---|---|---|---|---|---|
| Linear glycidyl ester | 0.0 | 0.0 | 6.0 | 0.0 | 3.0 | 4.0 | 2.0 |
| Second graft polymer 1 | 0.0 | 6.0 | 0.0 | 4.0 | 3.0 | 2.0 | 4.0 |
| MFR | 26.5 | 15.2 | 23.9 | 16.4 | 12.4 | 13.3 | 11.4 |
| 60° Gloss | 39.1 | 52.9 | 94.8 | 70.1 | 36.9 | 33.8 | 30.9 |
| Impact @RT | 11.6 | 13.8 | 14.3 | 13.4 | 13.8 | 14.7 | 14.0 |
| Impact @ −20° C. | 4.0 | 8.2 | 3.6 | 6.0 | 3.9 | 4.1 | 3.4 |
| Impact @ −30° C. | 4.0 | 5.4 | 3.1 | 5.6 | 2.8 | 2.8 | 3.0 |

The Second Graft Polymer included in the compositions shown in Table 1 is characterized in that it contains silicon in an amount of about 16% by weight.

TABLE 2

| Components | Control 1-1 | Control 2-2 | Control 2-3 | Example 2-1 | Example 2-2 | Example 2-3 |
|---|---|---|---|---|---|---|
| Linear glycidyl ester | 0.0 | 0.0 | 0.0 | 2.0 | 3.0 | 4.0 |
| Second graft polymer 2 | 0.0 | 6.0 | 4.0 | 4.0 | 3.0 | 2.0 |
| MFR | 26.5 | 16.7 | 17.7 | 13.3 | 12.8 | 13.0 |
| 60° Gloss | 39.1 | 41.3 | 55.6 | 27.0 | 34.6 | 33.0 |
| Impact @RT | 11.6 | 14.0 | 14.3 | 13.6 | 13.5 | 14.3 |
| Impact @ −20° C. | 4.0 | 9.8 | 8.0 | 5.4 | 5.0 | 5.8 |
| Impact @ −30° C. | 4.0 | 6.7 | 5.8 | 4.3 | 3.7 | 4.4 |

The Second Graft Polymer included in the compositions shown in table 2 is characterized in that it contains silicon in an amount of about 81% by weight.

The results demonstrate the lowered gloss of the composition attained by the inclusion of both "second graft polymer" and "linear glycidyl ester". Singly, each of these compounds increases the gloss of the composition. The surprising advantageous gloss values are attained without appreciably practical effect on processability and impact strength.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (A) 10 to 90 percent by weight relative to the weight of the composition (pbw) of an aromatic (co)poly(ester)carbonate,
   (B) 10 to 90 pbw of first graft (co)polymer containing a graft base and a grafted phase wherein the graft base contains at least one rubber selected from the group consisting of polyurethane, ethylene vinyl acetate, silicone, ethylene-propylene diene, ethylene propylene, acrylate, diene, and polychloroprene,
   (C) 1 to 20 pbw of a linear glycidyl ester functional polymer comprising repeating units derived from one or more glycidyl ester monomers, and
   (D) 2 to 4 pbw of a second graft (co)polymer containing a core and shell wherein the molecular structure of the core includes an interpenetrated network of poly(meth)alkyl acrylate and polyorganosiloxane, and wherein the shell contains poly(meth)acrylate,
   wherein the 60° gloss of the composition is below the 60° gloss level of a comparable composition containing only (C) or (D) alone.

2. The composition of claim 1 wherein the rubber has a second order transition temperature not higher than 0° C. per ASTM D-746-52T.

3. The composition of claim 1 wherein the rubber is selected from the group consisting of homopolymers of 1,3-dienes, copolymers and interpolymers of 1,3-dienes with one or more copolymerizable monomers.

4. The composition of claim 1 wherein the rubber is crosslinked.

5. The composition of claim 1 wherein the first graft (co)polymer contains 3 to 50 percent rubber component and wherein the grafted phase contains 49 to 96 percent polymerized monovinylidene aromatic monomer, and 1 to 48 percent of polymerized monoethylenically unsaturated polar monomer, the percents being relative to the weight of the first graft (co)polymer.

6. The composition of claim 1 wherein the first graft (co)polymer is acrylonitrile butadiene-styrene resin.

7. The composition of claim 6 wherein the acrylonitrile-butadiene-styrene resin is a product of mass suspension polymerization.

8. The composition of claim 7 wherein the acrylonitrile-butadiene-styrene resin is characterized in that its polybutadiene content is about 5 to 20 percent and in that its particle size ranges from about 0.3 to 6 microns.

9. The composition of claim 1 wherein the aromatic (co)poly(ester)carbonate is homopolycarbonate based on bisphenol A.

10. The composition of claim 1 wherein the linear glycidyl ester is a member selected from the group consisting of glycidyl acrylate and glycidyl methacrylate.

11. The composition of claim 1 wherein the glycidyl ester polymer comprises at least one repeating unit polymerized from glycidyl ester monomer and at least one repeating unit polymerized from α-olefin monomer.

12. The composition of claim 11 wherein the α-olefin monomer is a member selected from the group consisting of ethylene, propylene, 1-butene and 1-pentene.

13. The composition of claim 1 wherein the linear glycidyl ester functional polymer further contains an amount up to about 50% relative to its weight of repeating units derived from at least one member selected from the group consisting of vinyl aromatic monomers, vinyl esters and $C_{1-20}$-alkyl (meth)acrylates.

14. The composition of claim 1 wherein the linear glycidyl ester functional polymer is selected from the group consisting of olefin-glycidyl (meth)acrylate polymers, olefin-vinyl acetate-glycidyl(meth)acrylate polymers and olefin-glycidyl (meth)acrylate-alkyl(meth)acrylate polymers.

15. The composition of claim 14 wherein the linear glycidyl ester functional polymer contains structural units derived from ethylene, (meth)acrylate, and glycidyl(meth)acrylate.

16. The composition of claim 15 wherein the linear glycidyl ester functional polymer is a terpolymer selected from the group consisting of ethylene/alkylacrylate/glycidyl methacrylate; ethylene/alkyl acrylate/glycidyl acrylate; ethylene/alkyl methacrylate/glycidyl acrylate; and ethylene/alkyl methacrylate/glycidyl methacrylate.

17. The composition of claim 1 wherein the core contains an interpenetrated network of polybutyl acrylate and polysiloxane.

18. The composition of claim 17 wherein the shell is polymerized of methylmethacrylate.

19. The composition of claim 1 further containing at least one member selected from the group consisting of lubricant, mold release agents, nucleating agent, antistatic agent, thermal stabilizer, light stabilizer, hydrolytic stabilizer, filler, reinforcing agent, colorant, pigment, flame retarding agent and drip suppressant.

20. A thermoplastic molding composition consisting essentially of:
   (A) 10 to 90 percent by weight relative to the weight of the composition (pbw) of an aromatic (co)poly(ester)carbonate,
   (B) 10 to 90 pbw of first graft (co)polymer containing a graft base and a grafted phase wherein the graft base contains at least one rubber selected from the group consisting of polyurethane, ethylene vinyl acetate, silicone, ethylene-propylene diene, ethylene propylene, acrylate, diene, and polychlotoprene,
   (C) 1 to 20 pbw of a linear glyvidyl ester functional polymer comprising repeating units derived from one or more glycidyl ester monomers,
   (D) 2 to 4 pbw of a second graft (co)polymer containing a core and shell wherein the molecular structure of the core includes an interpenetrated network of poly alkyl (meth)acrylate and polyorganosiloxane, andwherein the shell contains poly(meth)arcylate, and
   (E) at least one member selected from the group consisting of lubricant, mold release agents, nucleating agent, antistatic agent, thermal stabilizer, light stabilizer, hydrolytic stabilizer, filler, reinforcing agent, colorant, pigment, flame retarding agent and drip suppressant
   wherein the 60° gloss of the composition is below the 60° gloss level of a comparable composition containing only (C) or (D) alone.

* * * * *